United States Patent [19]

Peter

[11] 4,276,815
[45] Jul. 7, 1981

[54] APPARATUS FOR OPENING, CONVEYING AND DIVIDING TUBULAR COVERINGS

[75] Inventor: Gerhard Peter, Bomlitz, Fed. Rep. of Germany

[73] Assignee: Gerhard Peter KG, Bomlitz, Fed. Rep. of Germany

[21] Appl. No.: 904,104

[22] Filed: May 8, 1978

[30] Foreign Application Priority Data

May 12, 1977 [DE] Fed. Rep. of Germany ....... 2721392

[51] Int. Cl.³ ............................................. B31B 23/02
[52] U.S. Cl. ....................................... 493/287; 17/34; 493/314
[58] Field of Search ................. 53/386, 367, 576, 575, 53/459, 469; 17/33, 34, 49, 35; 93/14, 18-20, 21-27, 84 FF, 84 R, 84 TW, 8 WA

[56] References Cited

U.S. PATENT DOCUMENTS

| 1,654,871 | 1/1928 | Gage et al. | 17/33 UX |
|---|---|---|---|
| 3,380,220 | 4/1968 | Jennings et al. | 53/469 X |
| 3,579,948 | 5/1971 | Lerner | 53/459 |
| 3,724,163 | 4/1973 | Roussel | 53/386 X |
| 3,798,870 | 3/1974 | Kanner et al. | 53/459 |
| 3,916,769 | 11/1975 | Turunen | 53/567 X |
| 3,919,739 | 11/1975 | Kawai | 17/33 |

Primary Examiner—James F. Coan
Attorney, Agent, or Firm—Sprung, Felfe, Horn, Lynch & Kramer

[57] ABSTRACT

The invention relates to a method and an apparatus suitable for carrying out the method for opening, conveying and dividing tubular coverings which are lain flat, moist, empty and which have not been taken in, optionally on covering, filling and seaming machines.

11 Claims, 12 Drawing Figures

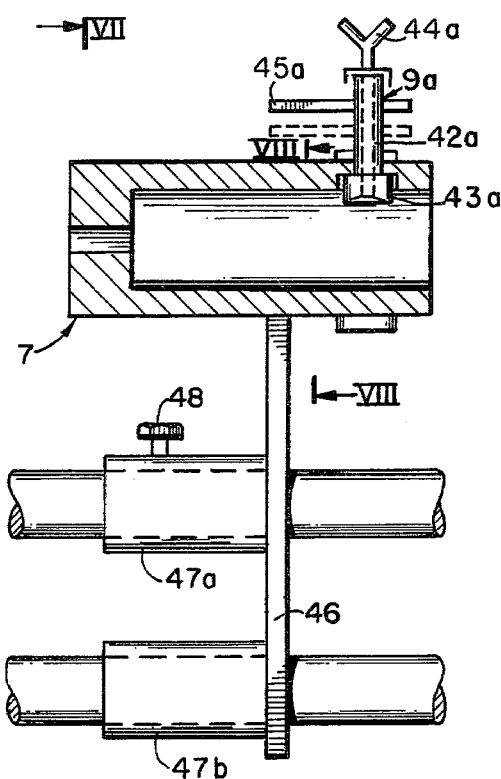
FIG. 6
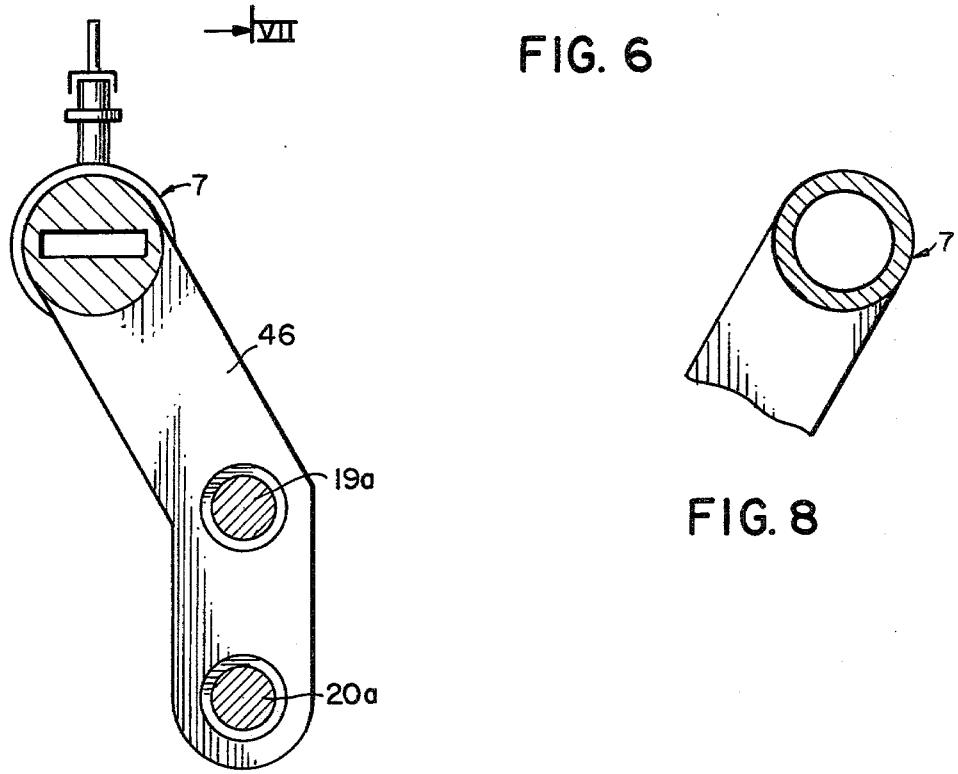
FIG. 7
FIG. 8

APPARATUS FOR OPENING, CONVEYING AND DIVIDING TUBULAR COVERINGS

Methods and apparatus for conveying tubular coverings on machines for filling and seaming tubular coverings are already known in large numbers from the literature. Thus, a corresponding conveyor is described in British Pat. No. 747,127 which is designed, however, only for the transportation of filled tubular coverings The constricting, rotating and transporting members described in that patent, in accordance with FIGS. 8 and 9 therein, function on the condition that friction as the result of counterbearings is present on an article with a tubular covering inflated with a covering filling composition or with air. A transporting function in the sense of the above-mentioned specification cannot be performed successfully with a sausage covering opened in a different manner without internal pressure in the covering.

Similarly, the device described in U.S. Pat. No. 3,108,138 for the step-wise transportation of coverings may be used only for the transportation of chains of filled coverings, because the grippers described here invariably grip a bonding point between two filled sections of this chain of covering, with the result that an empty tube cannot however be transported in the manner described.

A feed mechanism merely for filled coverings is obvious to the skilled man also from German Auslegeschrift No. 11 84 234 since the transporting members respond only to coverings filled under internal pressure. Empty sausage coverings cannot be conveyed with this mechanism.

The same applies to U.S. Pat. No. 3,152,358, which should also be mentioned in this context, but for a different reason. With the aid of the chain belt described in this U.S. patent with transporting members in the form of, for example, multiple tongs, it is possible to convey, per se, not only filled and clipped off sausages as described therein, but in theory also empty tubular coverings. However, the disadvantage arises with this mechanism that these empty tubular coverings cannot be held open on the conveying path, as is expedient with a subsequent tubular covering filling and seaming machine known per se. The apparatus described in this U.S. patent also ensures only the conveyance of filled sausage coverings of equal length.

The conveyance of open tubular coverings cannot be inferred either from U.S. Pat. No. 3,121,638, which should also be mentioned here and which describes the conveyance of tubular coverings, because only transportation of filled sausage covering chains may be effected by means of suitably designed hooks in this apparatus. As the hooks engage only in the constricting points of the filled sausage chains in the vicinity of the bond, the skilled man cannot infer information on the transportation of open, moist, empty tubular coverings which have not been taken in.

British Pat. No. 1,036,017, which is also known, describes a processing apparatus for the smoking, cooking and cooling of frankfurter sausage in the form of multiple chains. Eminently suitable transporting members in the form of cylindrical rollers with segments for predetermined equal sausage lengths with corresponding diverting slides and tongs are mentioned for this purpose and the latter engage only in bonding points or reduced diameters of the sausage chain. Moist, empty tubular coverings which have been lain flat and have not been taken in cannot be opened without further ado and conveyed and divided in the open condition either.

U.S. Pat. No. 3,264,679, also to be taken into consideration in the broader scope, describes an apparatus for the production of divided sausage coverings by dissecting filled tubes. Conveying corresponding empty, moist sausage coverings which have not been taken in is not considered because these sausage coverings have to be constricted on both sides to allow them to be conveyed by the apparatus described therein, and this is inexpedient owing to subsequent practical rapid filling of these coverings. In addition, an avoidable disadvantage is noticed in the concentric system described therein owing to passages which are too long with complicated machinery.

A transporting system for sausage coverings can also be discerned frm British Pat. No. 1,187,635 which invariably grasps the coverings at the points where the filled covering contracts, and which are designated as predetermined points of separation, and conveys them with M-shaped tongs arranged on the perimeter of annular chains, (slide caliper chain system). These M-shaped tongs are pushed above each other so as to grasp positively the sausage chain. This system is also not suitable for conveying open, moist, empty, tubular coverings which are not taken in.

For the same reason the technical teaching inferred from U.S. Pat. No. 3,487,498 is not to be transferred either to the conveyance of open, empty, moist tubular coverings which are not taken in, because the covering transporting members described therein can engage only in the outer wall of a covering if it is designed to be as incompressible as possible, and this is known to be the case only with filled sausage coverings.

The conveyance of sausage coverings (through 2 processing bath) by means of a gripper system disclosed in U.S. Pat. No. 3,595,672 is also unsuitable for conveying empty coverings.

The apparatus for carrying out a method for filling sausage coverings, disclosed in U.S. Pat. No. 3,873,744 is based on tubular coverings which have been taken in and leads to sausage chains as the end product. In view of the different object and mode of operation, the solution intended for this purpose is not suitable as an apparatus for conveying empty, tubular coverings which have not been taken in and are originally lain flat and then opened, with conveyance in the open condition; quite apart from the fact that this known tubular covering chain is conveyed in the same direction after being filled as it is prior to being filled whereas with the already known tubular covering machines which are to be used in conjunction with the conveyor of the type considered according to the invention the ready filled sausage coverings are carried off in the filled condition in the opposite direction in that in which they are supplied empty.

The other U.S. Pat. Nos. 3,150,410, 3,195,176 and 3,694,853 to be mentioned here are also unsuitable for opening, conveying and dividing moist empty, open tubular coverings which are not taken in, because they are intended only for the corresponding conveying and filling of tubular coverings which have been taken in.

The conveying methods and conveying apparatus of the type disclosed in U.S. Pat. Nos. 2,948,093 and 3,122,989 are even further removed from the subject of the present invention since they only provide the skilled man with technical teaching with respect to the treatment of skinless or covering-free sausages.

Recently, a method and an apparatus for the pneumatic conveyance of empty sausage coverings became known for the first time from German Auslegeschrift No. 11 39 049. Although this apparatus allows careful conveyance of tubular coverings, the path of tubular covering transportation is only very short because the apparatus shown in FIG. 1 of that specification allows only a "pin-point contact" of the vacuum nozzles on the tubular outer covering. Although this is quite sufficient for the purpose set in that Auslegeschrift, that is to say the taking in of tubular coverings, it is not suitable for a prolonged path of conveyance of empty tubular coverings to the position where they are further processed. Owing to this difference in purpose, the solution which is provided is also different, and for this reason the technical teaching of this German Auslegeschrift is not applicable to the subject of the present invention.

Although German Auslegeschrift No. 15 74 437 could in principle provide the skilled man with a suggestion for the transportation also of empty, moist tubular coverings which have not been taken in, the principle described therein would not make obvious the concept of the invention set out above for several reasons, both because unwinding from a supply roller moving to and fro and demanding a complicated apparatus has to take place and because an open, empty tube cannot be transported satisfactorily. over a prolonged path using this apparatus.

A method and an associated apparatus for the production of filled tubular coverings is known from U.S. Pat. No. 3,919,739, according to which the pneumatic conveyance known from the earlier German Auslegeschrift No. 11 39 049 has obviously been modified more recently in such a way that mechanical internal expansion is effected for carrying out the method instead of internal expansion by inflation disclosed in the older German Auslegeschrift. The covering is widened by this mechanical internal expander, held at the filling nozzle during subsequent filling and only then separated from the continuous covering. This method has substantial disadvantages including, among other things, the fact that a mechanical widening of the covering, particularly with moist, empty tubes, places severe demands on the strength of the covering. This is aggravated.

By the fact that during the filling process the covering is held on the filling device whereas in the method (and apparatus constructed in accordance with the method) known per se and not claimed herein, it is moved away from the filling position in a manner which does not damage the material, by means of a so-called "skin brake". In addition, the subsequent mechanical treatment of the covering is complicated and susceptible to failure. As is known, this further mechanical treatment has to be carried out on a reciprocatingly guided support in addition to widening on an internal shaping piston, in order for filling to take place in an orderly manner while securing the covering, in which case the filling belt also has to be drawn back by means of a belt return mechanism created for that very purpose. This merely gives a skilled man encouragement to simplify the apparatus required for carrying out the method as far as possible because the above-mentioned information from the state of the art does not represent a practicable solution for the reasons listed above. It does not provide a solution to the difficulties which occur during the conveyance of empty, moist tubular coverings which have not been taken in and are lain flat, after they have been opened, (in combination with division of the tubular coverings) to the position where these tubular coverings are filled and seamed. The same applies to German Offenlegungsschrift No. 21 14 999 which should be mentioned in this context and which substantially corresponds to parallel U.S. Pat. No. 3,777,331. In this patent, it is also necessary to insert in the covering an internal calibration member as a type of "foreign body", that is to say for expanding the covering, before the tubular covering member which is also subsequently sealed off flat on the face in an unusual manner can be supplied to a filling machine prior to being separated.

Apart from the fact that the popular sausage ears having hemispherical shape cannot be produced at all in this manner and a central, widespread and readily introduced fixing of a sausage suspension is also not possible in this manner, this type of transportation of the covering appears to incur high production costs and great inconvenience in view of the almost exclusively manual operation.

German Gebrauchsmuster Application No. 76 08 036 finally published in 1976 gives the skilled man, in principle, a technical suggestion of how a tubular covering may be conveyed by a feed mechanism which operates at different gas pressures (vacuum/super pressure), but this, introduction to technical action has a number of defects. First of all, that Gebrauchsmuster application indicates nowhere the appearance of a transporting slide which has more than only one semi-circular cross-section, although the statement of claim relates to such a slide with a semi-circular to circular cross-section. There is no indication that, for example, with a round cross-section, the tube to be conveyed firstly has to be traversed by this slide if this slide is not made up of two half-shells, and this is not described at any point either. A more important defect is the absence of any inventive introduction for technical action, concerning the apparatus to which the transporting slide is attached and the appearance of this apparatus, so that suitable friction-free supply of tube coverings is possible in a unit known per se for filling such tubular coverings which operates by the rhythm method but which is not described here either. In addition, the skilled man receives no indicaton of how the open tubular coverings shown in the single drawing in this Gebrauchsmuster are opened for the first time, as is necessary, for example, with a wound tubular covering lain flat. Finally, with an objective of opening not only empty tubular coverings which have not been taken in and are lain flat but also moist tubular coverings, and of transporting and dividing them after they have been opened, the information may be inferred from the Gebraudsmuster by the skilled man, that for improved transportation of the tube, the feed mechanism engaging in the exterior of the tube is to be provided with a porous friction coating made of emery for improved grip. This is a disadvantage since any friction coating has an uneven surface, regardless of the material of which it is made and it can consequently damage moist tubular coverings which are thus unstable with respect to their tear-resistance, in certain circumstances.

Since friction coatings of the most varied designs are the characterizing part of the main claim of that Gebrauchsmuster, it should at the same time be noted that the suction-adhesion action of a vacuum applied to the tubular outer covering is obviously not sufficient for satisfactory transportation of such tubular coverings when using the apparatus portrayed in that Gebrauchsmuster. The question also remains unsolved for the skilled man of how the tube portrayed in the single figure does not collapse upon application of a vacuum only on half a side owing to the semi-circular cross-section of the transporting slide, but rather maintains its round cross-section without being internally inflated. However, to simplify transportation, a tubular covering transportation means should be found, as already stated above during evaluation of the state of the art, in which an internal calibration pin or expanding pin or even alternatively inflation of the tube is dispensed with in a simplified progressive manner but in which satisfactory conveyance of the covering even in the open condition is nevertheless possible even without porous or other friction coatings. Having regard to this relatively extensive state of the art described above, the unsolved problem is to firstly open, then convey and finally divide empty and moist tubular coverings which have been lain flat and have not been taken in, in a simple and uncomplicated manner which is economical in material, initially without having recourse to action on the interior of the tube, in order subsequently to fill and seam the sections of tube thus formed simply with apparatus known per se.

Such an object is achieved by means of a corresponding method in which according to the invention the tubular coverings which are originally lain flat, moist, empty and not taken in are opened, conveyed and divided in such a way that the tubular coverings are opened only by gaseous reduced pressure or gaseous super pressure of different strengths acting merely on the exterior of the covering and in the opened state are transported by conveying means acting on both sides of the tubular covering alternately on the outer wall of the tubular covering to the covering filling and seaming position so that the coverings are finally seamed on one side prior to filling but during division.

With the aid of this method according to the invention it is possible for tubular coverings of various diameters to be suitably processed, that is to say opened, conveyed and divided without further ado. Another advantage is that owing to the pneumatic opening and conveying according to the invention of the tubular coverings, the vacuum to be applied to the exterior of the coverings for this purpose can be adapted to the differing gas permeability of the tubular covering which is dependent upon the wall of the covering and which prevails at any given time. It is thus possible, with the aid of the method according to the invention, to convey and to process, not only tubular coverings which are impermeable or only very slightly permeable to gas, but also micro-porous and in special cases even macro-porous tubular coverings of commercially known types. The method according to the invention also allows a step of the method to be saved since, in particular, while a front section of tubular covering, which has already been opened in a previous cycle, is conveyed in open condition, an adjacent rear section can be opened.

In accordance with this progressive method according to the invention, an apparatus suitable for carrying out the method is designed in such a way that tubular covering opening, conveying and dividing elements which function continuously in rhythm move a substantially moist tube, which has not been taken in, from an unwinding device arranged stationarily with respect to the rest of the apparatus in a tubular covering section filling and seaming unit known per se in readiness for filling wherein a pneumatically operating tubular covering opening unit in rhythmic combination with a pneumatically operating tubular covering conveying unit is arranged, in rhythmical spatially overlapping synchronization with a tubular covering dividing unit and tubular covering partial seaming unit, one after the other on the tubular covering conveying section and wherein the tubular covering conveying unit is provided with conveying gripper devices which grasp and convey the open tubular coverings free from filling on their outer circumference in alternation of rhythm and side, which are also movably mounted in the tubular covering conveying direction on both sides of the tubular covering, which are tong-like and adjusted for variable charges of gas pressure.

Based on the above-mentioned spatially overlapping rhythmical synchronization of elements of apparatus according to the invention and commercially available elements of apparatus, it is possible without friction to adapt commercially available tubular covering filling and seaming machines to the rhythmically continuous operation of the tubular covering opening, conveying and dividing apparatus according to the invention.

In order to open the tubular covering satisfactorily, it is beneficial to provide the tubular covering opening unit with at least two tubular covering loosening devices, these being operable to open relatively stiff and independently supported tubular coverings. With relatively soft flexible non-self-supporting tubular coverings, it is advantageous to provide more than two tube loosening devices, for example, 3, 4, 6 or 8 of these devices. The apparatus according to the invention can thus be adapted to very varied tubular covering materials.

It is particularly advantageous if the tubular covering opening apparatus according to the invention is mounted slidably on support elements, for example guide rails, in conjunction with holding and guiding devices. The tubular covering opening apparatus can thus be adjusted at a suitable distance from the carriers to fit the respective different lengths of tubular covering to be divided and be determined and fixed until the next change in the length of the tubular covering.

It is also advantageous if the carriers are coupled at a distance because the space remaining between these carriers is then utilized for clipping off and insertion of loops with the aid of a suitable clipping and loop insertion device which is known per se. Furthermore, the carriers move on the associated cross-beams with corresponding adjustment to the tubular covering length desired later on up to their respective end position dependent thereupon. In this case, the carriers are activated in a particularly advantageous manner by a pneumatic control. In special cases, it is obviously also possible to provide, instead of the pneumatic control, a mechanical control, for example, in the form of spindle drives. Such a control however, is not preferred and therefore not shown in the figures.

Generally speaking, it is sufficient if each carrier, each of which beneficially having an upper and a lower half tong, has in each of these half tongs a tubular covering loosening device which beneficially operates pneumatically by means of reduced gas pressure or gas super pressure. However, if tubular coverings with insufficient inherent rigidity or insufficient gas impermeability of the tube walls are also to be handled with the aid of the tube-opening and conveying apparatus according to the invention, it is sufficient to design the apparatus according to the invention in such a way that each of the above-mentioned half tongs has not only one, but two or even more loosening devices in each case, whereby the tubular covering to be conveyed is grasped at the same time at various numerous positions on its surface, determined externally by vacuum, and is conveyed with reliable maintenance of a lumen formation which is at least oval to elliptical.

It is obviously also possible within the scope of the invention to design the above-mentioned carrier in such a way that after disconnecting the vacuum pneumatics, the release of the pneumatically held tubular coverings from the tubular covering loosening devices is accelerated by charging these loosening devices with compressed air. In these cases, it is possible to provide the tube nipple arranged on the tube loosening apparatus with a forked end piece so that an alternative vacuum charge or compressed gas charge may be carried out as required by means of the fork. Instead of a fork, it is also possible to use tube nipples which have been introduced separately into the carrier for applying a vacuum or super pressure, this being somewhat more inconvenient but obviously also possible.

If tubular coverings are to be conveyed with as few interruptions as possible using the above-mentioned apparatus according to the invention, this can be achieved, for example by using roller diameters which are as large as possible in the tubular covering unwinding unit.

It is most beneficial to insert a commercially available automatic roller magazine exchange unit upstream of the covering opening and conveying unit according to the invention, so that completely undisturbed cyclically continuous operation may be ensured.

In addition, the apparatus of the invention can obviously also be operated with a number of other conventional known devices coupled in as functional units. It is possible to provide, for example, an optical error detecting instrument known per se for automatic discovery of faulty tubular covering regions of the type which may occur with automatic roller exchange and also with product damaged in itself on the unwinding unit, without adversely affecting the advantages of the apparatus according to the invention.

It is also possible, if desired, to operate the apparatus according to the invention not in conjunction with the above-mentioned devices already known per se. such as for example a tubular covering section filling and seaming unit, but to deposit the tubular coverings which have been opened and conveyed by the apparatus according to the invention and are sealed on one side, empty. These "pre-opened" coverings can then be filled and seamed selectively in a subsequent separate operation. This can have the advantage, for example, that such "pre-opened" tube sections, depending upon the covering material, no longer display the disadvantage even in the moist state of adhering very firmly to each other, making it very difficult to slide the tubular covering sections on to the filling spout in contrast to which the handling of so-called "pre-opened" tubular covering sections for filling purposes is quite simple and problemfree when using the apparatus according to the invention. In the further case where the quantity of covering filling prepared is smaller than the quantity of covering units prepared for it, the opening conveyor and closure apparatus according to the invention can obviously continue running for an optional period for the production of empty pre-opened tubular covering sections without damage, without the known filling and seaming machines being operated as functional units.

In use of the invention it is possible to seal the coverings using commercially available fastening knots with loops for hanging filled tubular coverings, or to dispense with the use of fastening knots, when plastic tubular coverings are used, by sealing the ends of the skins be welding these ends together.

As a further variation, a tubular covering which is not only moist or hydrated but which is also simultaneously preserved with the aid of suitable substances may be used as a starting material without adversely affecting the invention.

In addition, the tubular coverings may of course either be ordered in moisture-retaining marketable and transportable packing in order to provide the desired properties or may also equally well only by hydrated or moistened instead shortly prior to use in the apparatus according to the invention and for carrying out the method according to the invention.

If the tubular covering opening, conveying and dividing apparatus operating cyclically continuously according to the invention is to be operated in functional units with subsequent processing machines known per se taking into consideration the alternative possibilities listed above, then this may be carried out with known filling and seaming machines, for example, with devices of the type known for example from German Auslegeschrift No. 21 24 282.

In this way, it is possible to take into consideration the economical processing of tubular coverings, the requirement of which is produced by the limited length of taking-in beads, providing that instead of the relatively short taking-in-bead parts of 10, 20 or 50 meters, considerably larger tubular coverings having a length of, for example, 500 meters, placed on a winding unit, may be processed in the manner described above without interruption, so that there is still the above-mentioned advantage of the insertion of an automatic winding roller exchange unit.

Tubular coverings with very varied calibres (cross-sections or lamina) may be processed without further ado by means of the moving half tongs according to the invention.

The application of the method according to the invention and the associated apparatus is essentially also independent of the tubular covering materials. Thus, for example, both tubular coverings made of cellulose substances such as cellulose regenerate or cellulose derivatives with and without fibre reinforcement, and also tubular coverings made of collages, starch, polyamide, polyvinyl chloride, polyvinylidene chloride, and other macromolecular compounds may be used without further ado. In special cases it is advisable with particularly sensitive tubular covering materials to coat the moving conveyor devices according to the invention with flexible soft PVC or rubber substances.

The subject of the present invention will now be described in more detail with reference to an example of the invention shown in FIGS. 1 to 8 which shows the most important elements of the apparatus in their spatial arrangement as well as the associated mode of operation of the apparatus.

EXAMPLE OF METHOD

A commercially available continuous fibre-reinforced tubular covering containing cellulose substance, with 12% by weight moisture, based on the weight of absolutely dry material a wall strength of 100 my and a calibre diameter of 60 mm is drawn off at a speed of 15 m per minute in rhythmical steps of 50 cm, corresponding to a rhythmical number of 30 per minute and is opened by means of a vacuum of 700 Torr and is conveyed over a distance of 150 cm, corresponding to 3 steps each of 50 cm, to the dividing position and one-sided seaming position. There, the opened tubular covering treated in this way, as required, is either carried off empty or is filled with a pasty product to be packed, for example sausage meat, and is subsequently sealed in known manner and carried off. A weight of 1.5 to 2 tons per hour of commercially available sausage meat may be processed in this way with reference to the above-mentioned number of steps per unit time in conjunction with the rate of conveyance.

The figures will be described with reference to the following embodiment.

Figure 5:
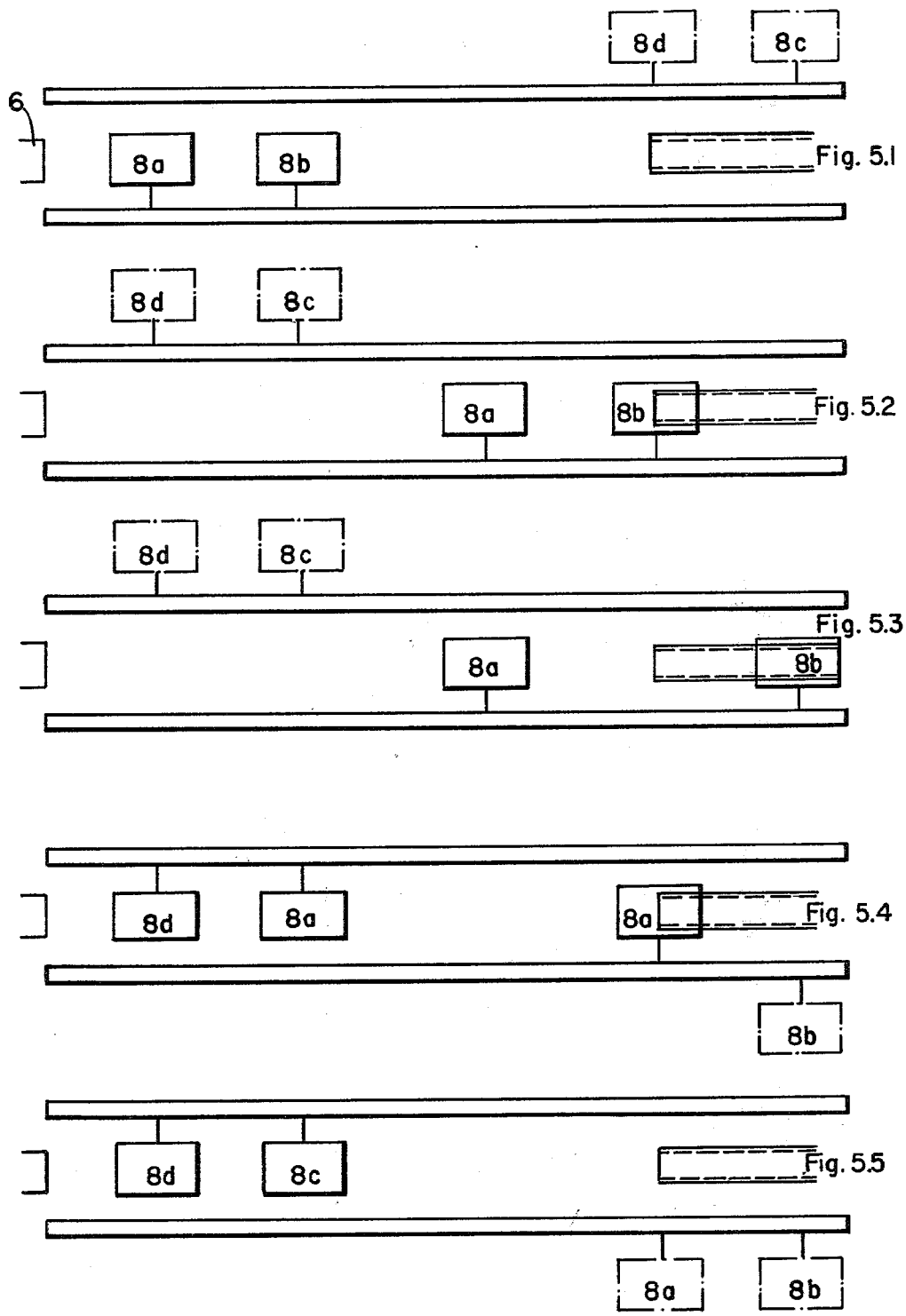

FIGS. 5.1, 5.2, 5.3, 5.4 and 5.5 are five sketches showing functionally diagrammatic views of the successive steps in the movement of the carrier groups.

FIG. 6 shows a tubular covering opening apparatus 7. (position 9b is omitted for the sake of clarity).

FIG. 7 shows a section through the tubular covering opening apparatus 7 according to the invention along line VII—VII (position 9a is not numbered and position 9b is omitted for the sake of clarity).

FIG. 8 shows a partial section through the tubular covering opening apparatus 7 according to the invention along line VIII—VIII.

The numbers and names for the associated parts of the apparatus used in the context of the following description of the figures and apparatus are listed together below for the sake of clarity.

Figure 1:
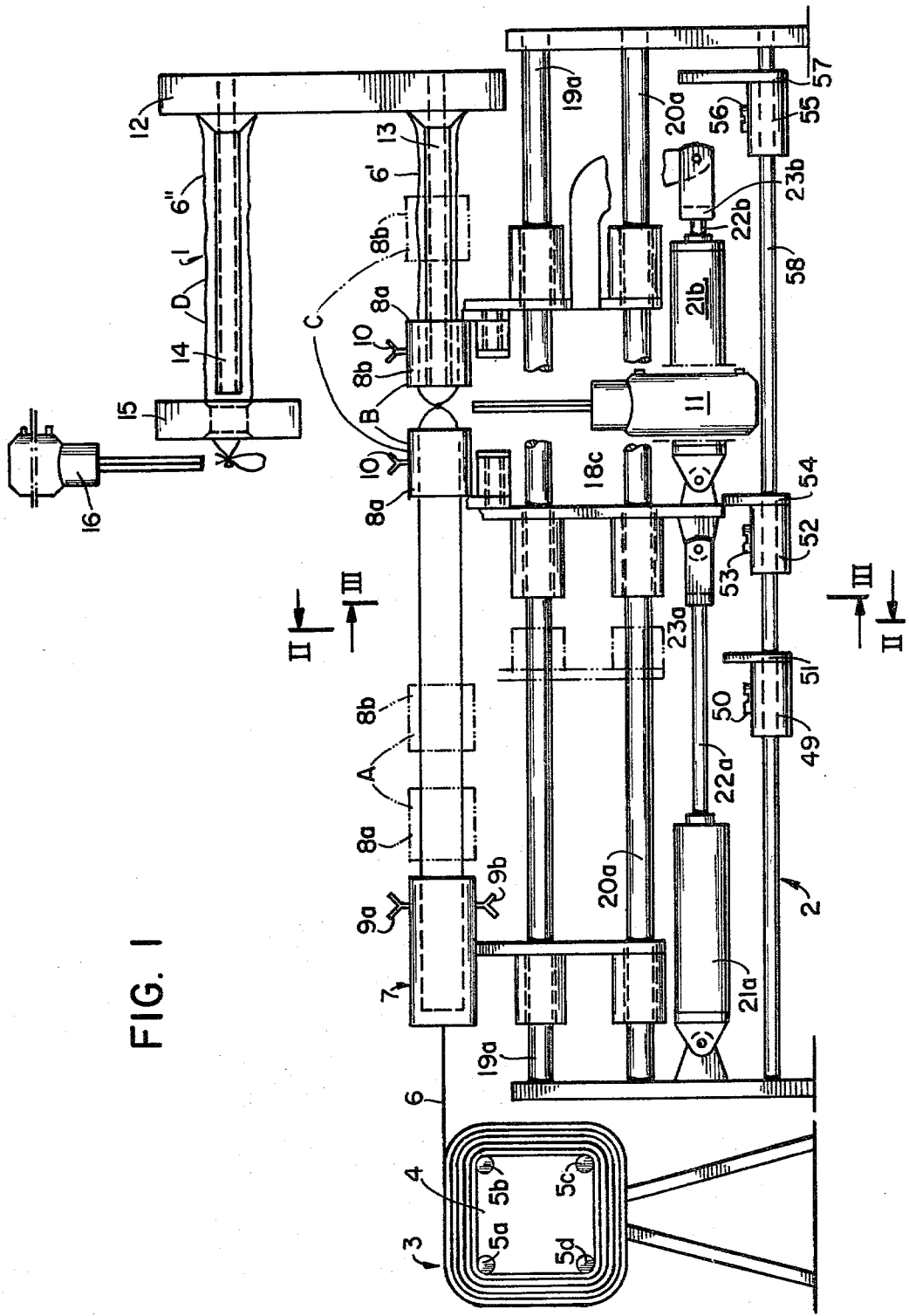
FIG. 1 shows a view of the opening, conveying and dividing apparatus according to the invention in combination with a tube unwinding unit known per se as well as a filling and seaming unit also known per se.

1—Sausage skin filling and clipping machine
2—Sausage skin preparation machine component
3—Unwinding unit
4—Winding core with take up disc
5a, 5b, 5c, 5d—Tension pins
6—Tubular covering
7—Tubular covering opening apparatus
8a, 8b, 8c, 8d—Carriers
9a, 9b—Tubular covering lifting device (in opening apparatus 7)
10aI, 10bI, 10cI, 10dI, 10aII, 10bII, 10cII, 10dII,—Tubular covering lifting device (in carrier group 8a to 8d)
11—Sealing, clipping, separating and loop-inserting instrument
12—Automatic filler-revolver
13,14—Filling tubes(of the automatic filler-revolver 12)
15—"Skin-brake"
16—Closing and clipping apparatus
17a, 17b, 17c, 17d—Carrier holders
18a, 18b, 18c, 18d—Saddle aprons-slides
19a, 19b, 20a, 20b—Cross-beams
21a—Compressed air cylinder (moves the carrier group 8a, 8b)
21b—Compressed air cylinder (moves only the carrier 8b), covered by 21a in FIG. I
21c, 21d—Compressed air cylinder (not shown in FIG. 1, since lies behind 21a, 21b and is therefore partially covered)
22a, 22b—Piston rods
22c, 22d—Piston rods (not visible in FIG. 1, since covered by 22a and 22b)
23a, 23b—Fork heads
23c, 23d—Fork heads (not visible in FIG. 1, since covered by 23a and 23b)
24a, 24b, 24c, 24d—Upper half tongs
25a, 25b, 25c, 25d—Lower half tongs
26a, 26b, 26c, 26d—Casing tube
27a, 27b, 27c, 27d—Tube nipple
28a, 28b, 28c, 28d—Nozzles
29a, 29b, 29c, 29d—Adjustment securing nuts (for casing tubes 26a, 26b, 26c, 26d)
30a, 30b, 30c, 30d—Coupling bearing
31a, 31b, 31c, 31d—Tongs-journals
32a, 32b, 32c, 32d—Tong hinges top
33a, 33b, 33c, 33d—Tong hinges bottom
34a, 34b, 34c, 34d—Tongs-control cylinders
35a, 35b, 35c, 35d—Tong lever-hinges
36a, 36b, 36c, 36d—Tongs-control cylinder-fastenings
37a, 37b, 37c, 37d—Carrier-tong holder-bearings
38a, 38b, 38c, 38d—Carrier-tong holder-control cylinders
39a, 39b, 39c, 39d—Carrier-tong cylinder-hinges
40a, 40b, 40c, 40d—Upper guide bushes
41a, 41b, 41c, 41d—Lower guide bushes
42a, 42b—Guided casing tubes
43a, 43b—Nozzles
44a, 44b—Tube nipple with connecting pieces
45a, 45b—Bearings for stroke control
46—End plate
47a, 47b—Bearing bushes
48—Fixing apparatus
49, 52, 55—Bushes
50,53,56—Fixing screws
51,54,57—Buffer plates
58,58a—Rails The entire sausage skin filling and clipping machine 1 shown together in FIG. 1 comprises, among other things, the tubular covering preparation machine unit 2 which is preceded by the unwinding unit 3 which in turn possesses a winding core 4 with a corresponding take-up disc in which tension pins 5a, 5b, and 5c and 5d are inserted.

A tubular covering 6 is wound round the tension pins. The tubular covering opening apparatus 7 following the tubular covering unwinding unit 3 which is illustrated in more detail in FIGS. 6, 7 and 8, incorporates the tubular covering lifting device 9a, 9b. This tubular covering lifting device comprises, in turn, the guided casing tubes 42a, 42b which open into corresponding nozzles 43a, 43b. The moving casing tubes and nozzles are connected via bearings 45a, 45b to a stroke control means not shown here. The other end of the guided casing tube 42a, 42b lying opposite the nozzles 43a, 43b is connected to tube nipples 44a, 44b bearing connection pieces.

The entire tubular covering opening apparatus 7 is slidably arranged on support elements which among other things include the end plate 46 as well as the bearing bushes 47a and 47b arranged on the cross-beams 19a and 20a, so that the bearing bushes which move per se may be arrested by a fixing device 48 located in the bush 47a. So-called carriers 8a, 8b, 8c and 8d are also arranged on the cross-beams 19a, 19b, 20a and 20b and each of the carriers 8 is provided with two of the tubular covering opening elements 10aI, 10bI, 10cI, 10dI and 10aII, 10bII, 10cII, and 10dII.

The movement of these carriers described in more detail in the mode of operation described below of the apparatus is positionally characterized in FIG. 1 by the letters "A", "B" and "C" and in FIG. 4 by "A" and "B". It should be noted here that for a correct disclosure of the concept of the invention, the carriers 8a, 8b are each shown three times and then partially in broken line with respect to their various positions A, B and C in FIG. 1 which depend upon operation, so that the position of the carrier 8b in position B corresponds to the later position of the carrier 8a in position C (cf. also the positions of carriers 8a, 8b, 8c and 8d in FIGS. 4 and 5).

Figure 2:
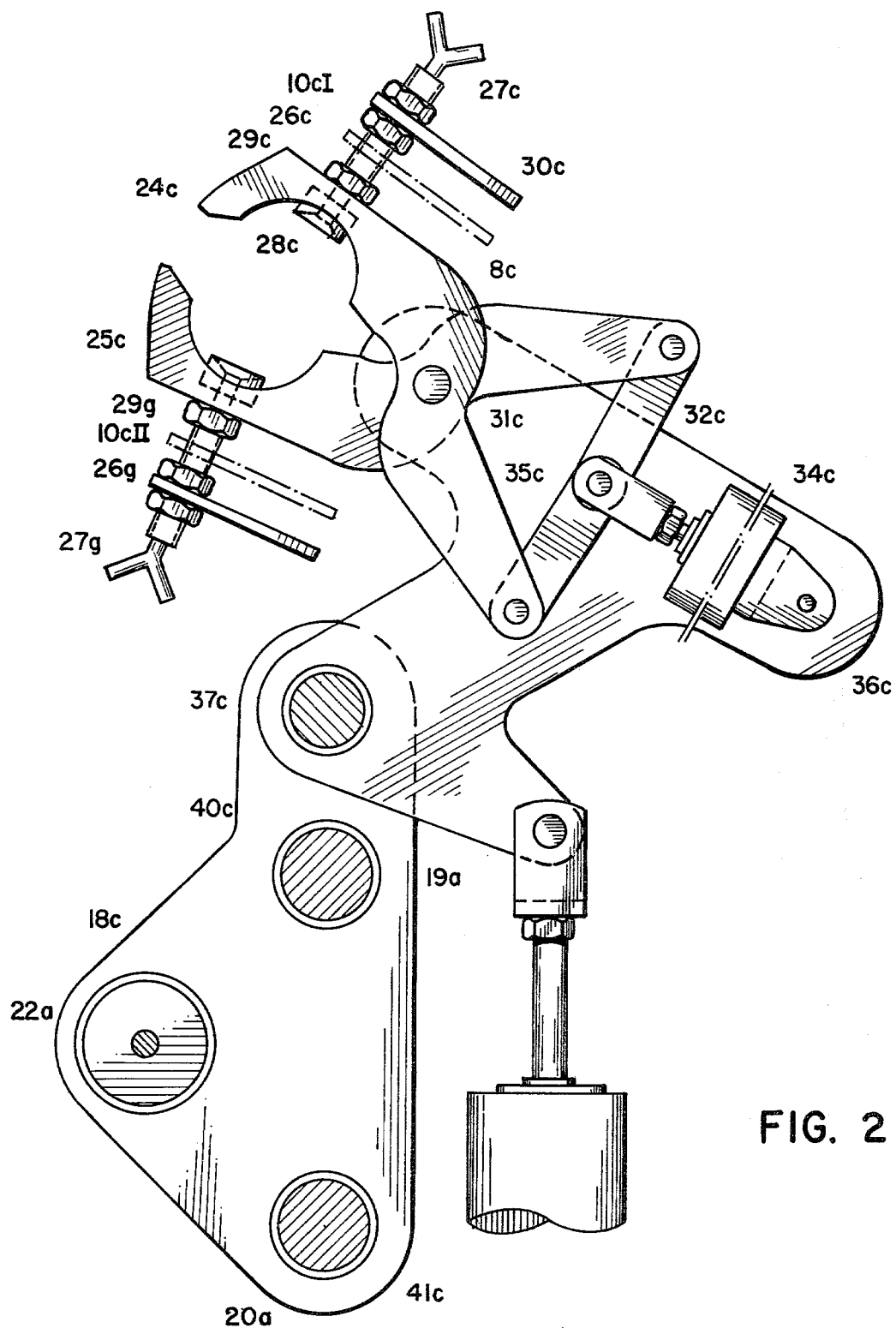
FIG. 2 shows a section through the conveying apparatus according to the invention along line II—II.
Figure 3:
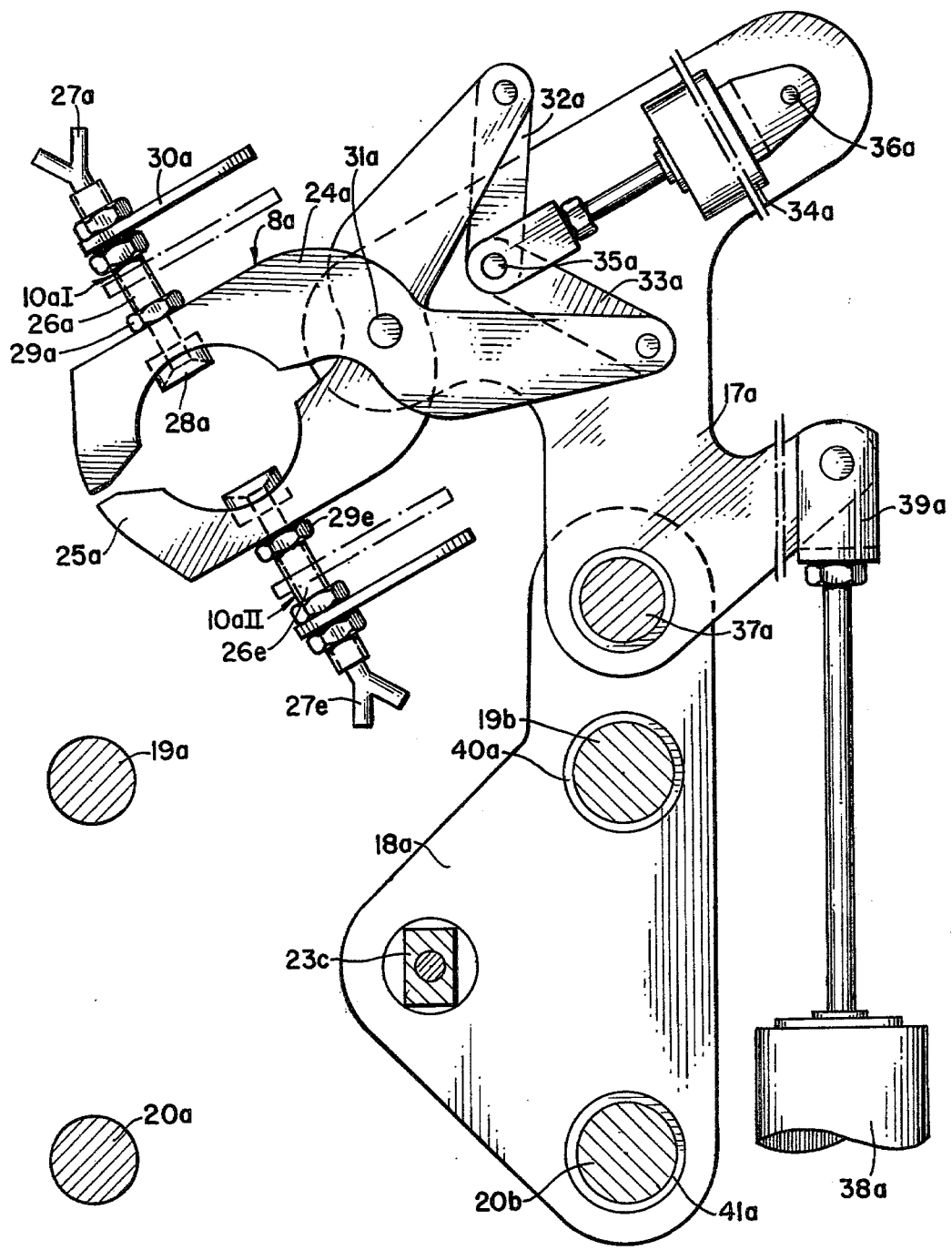
FIG. 3 shows a section through the conveying apparatus according to the invention along line III—III.

FIGS. 2 and 3 show the exact structure of one of these carriers 8.

Accordingly, FIG. 2 shows the carrier 8c, (cf. also FIG. 4, section alone line II—II) with its associated carrier holder and its saddle apron slide 18c.

The respective carrier is designed as a moving tong which may be charged with gas pressure and accordingly contains devices for charging with vacuum and super pressure as well as elements which make the tongs movable. Four upper half tongs 24a, 24b, 24c and 24d are consequently movably connected via the tong journals 31a, 31b, 31c and 31d to the lower half tongs 25a, 25b, 25c and 25d in the four carriers. One device is inserted in each of the eight resulting half tongs for charging with different gas pressures. This device consists of casing tubes 26, tube nipples 27, nozzles 28 and adjusting nuts 29 for the casing tubes 26. With eight half tongs, eight of the above-mentioned devices for charging with gas pressure with their apparatus elements are also provided, that is to say 27a to 27h, 28a to 28h and 29a to 29h, only four of the eight units being shown in the drawings and consequently only the parts 27a to 27d, 28a to 28d and 29a to 29d being shown in the above key to the components of the apparatus.

These tubular covering lifting apparatus 10 may be moved with the aid of the associated coupling bearings 30a, 30b, 30c and 30d owing to their movable mounting in the half tongs 24 and 25. The tongs are opened and closed by four associated tong control cylinders 34a, 34b, 34c and 34d respectively which adjust the tongs via the tong lever couplings 35a, 35b, 35c and 35d with associated tong couplings 32a, 32b, 32c and 32d as well as 33a, 33b, 33c and 33d. This entire tong system, which is referred below simply as the carrier is movably and adjustably mounted on the respective carrier supports 17a, 17b, 17c and 17d by means of the above-mentioned tong journals 31a, 31b, 31c and 31d on the one hand and by means of the tong control cylinder fastenings 36a, 36b, 36c and 36d on the other hand. These four carrier supports in turn are now movably mounted with the respective saddle apron slides 18a 18b, 18c and 18d which are movably arranged on the cross-beam 19a, 19b and 20a and 20b by means of the associated carrier support bearings 37a, 37b, 37c and 37d in such a way that they are designed to tilt with the aid of the respective carrier support control cylinder 38a, 38b, 38c and 38d functionally adapted via the carrier cylinder couplings 39a, 39b, 39c and 39d. The axially parallel shifting ability of the carriers required for conveying the tubular coverings is obtained by corresponding piston rods 22a, 22b, 22c and 22d which shift the saddle apron slides 18a, 18b, 18c and 18d and which have corresponding coupling to the associated fork heads 23a, 23b, 23c and 23d, so that the assembly causes movement by pneumatic charging of the corresponding associated compressed air cylinders 21a, 21b, 21c, 21d and so that the compressed air cylinder 21a moves the carrier group 8a and 8b and the compressed air cylinder 21b moves the carrier 8d. Further details about this will also be given in the following description of the mode of operation of the apparatus according to the invention. The compressed air cylinders 21c and 21d control and cause corresponding movements of the carrier groups 8c and 8d. Furthermore, the compressed air cylinders 21c, 21b and 21d are partially covered and cannot be recognized in the drawings. In order to complete the description of the arrangement of the individual elements of the apparatus according to FIGS. 2 and 3 in relation to each other, it should finally merely be mentioned that the cross-beams 19a, 19b, are surrounded by upper guide bushes 40a, 40b, 40c and 40d inserted in the saddle apron slides 18a, 18b, 18c and 18d.

In addition, the bush 49 with fixing screw 50 and buffer plate 51, the bush 52 with fixing screw 53 and buffer plate 54 as well as bush 55 with fixing screw 56 and buffer plate 57 are adjustably arranged on a common rail 58 which supports all three bushes 49, 52 and 55.

According to the above-mentioned embodiments, in the respective figures the elements to be mentioned, however obscured by other elements are also arranged on a rail 58a, also no visible in the drawings, which runs parallel to the rail 58. Concerned here are elements 49a to 57a, not visible in the drawings, corresponding to visible elements 49 to 57, and performing the same function as the elements 49 to 57.

In the tube opening and conveying apparatus according to the invention, whose most important elements are described above, devices are arranged as functional units with these elements which devices are known per se apart from the invention. An exact description of these known devices can therefore be omitted at this point, since, moreover, protection for the parts of these devices is not claimed in the scope of the present invention. These devices which are known individually per se are a sealing, clipping, separating and tube inserting device 11, a commercially available known automatic filling revolver 12 with the filling tubes 13 and 14 attached to the revolver, a so-called "skin brake" 15 and a clipping and closing apparatus 16 sealing the filled sausage covering.

In addition, reference is made to FIGS. 5.1 to 5.5 with respect to the operation cycle of the tubular covering conveying device according to the invention.

These figures relate exclusively to the mode of operation of the apparatus according to the invention and are therefore dealt with in the following description of the mode of operation of the entire apparatus.

A tubular covering 6 which is wound on an unwinding unit 3 is drawn from the unwinding unit 3 which comprises a rotatably mounted winding core with take-up disc 4 and tension pins 5a, 5b, 5c, and 5d and is drawn forward through the tubular covering opening apparatus 7 of the tubular covering preparation machine 2 to the carrier 8a located in position A of the tubular covering conveyor consisting of the carrier groups 8a, 8b, 8c and 8d. The tubular covering is subsequently opened up pneumatically by the tubular covering opening apparatus 7 with its lifting devices 9a, 9b and opened or kept open by the pneumatic tubular covering lifting devices 10 located in the carriers 8a, 8b, 8c and 8d, respectively.

The tubular covering 6 in the resulting opened state is then conveyed by the movement of the carrier 8a from position A into position B, the carrier 8b preceding the carrier 8a.

The carriers 8c, 8d which have pivoted out, run simultaneously in the opposite direction, that is to say from position C via position D back into position A, where they then remain in the rest position.

In the meantime, this covering is sealed in a manner known per se, described above, in position B between the carriers 8a and 8b holding the tube and is separated next to the sealing position on the side facing the unwinding unit 3.

Although the unseparated part of the tubular covering 6 remains fixed at its end in position B by carrier 8a, so that position B corresponds spatially to position C with respect to carrier 8a, carrier 8b conveys the separated part of the tubular covering from position B into position C with further shifting of the covering onto the filling tube 13.

The advancing carrier 8b as a member of the carrier group 8a, 8b located in position C subsequently pivots from the imaginary tubular covering conveying axis and out of the region of rotation of the automatic filling revolver 12 of the tubular covering filling machine. Thereupon, the carrier 8a pulls the tubular covering 6 with forward motion to that position which previously took the carrier 8b in position C, on to the newly introduced filling tube 14 previously freed from the section of the tubular covering 6. (A mechanical support for this tubular covering in this position which is necessary if the tubular coverings are not sufficiently self supporting has been omitted from the associated figures for the sake of clarity).

The tube is then grapsed in position A by the carrier group 8c, 8d which is arranged on a different guide apparatus from carrier group 8a, 8b.

The carrier 8a becomes loose and its tong-like holder opens from the tubular covering 6 and pivots from the imaginary tubular covering conveying axis. The tubular covering 6 is then brought from position A into position B by the carrier group 8c, 8d and thus introduces the next cycle of operation.

Figure 4:
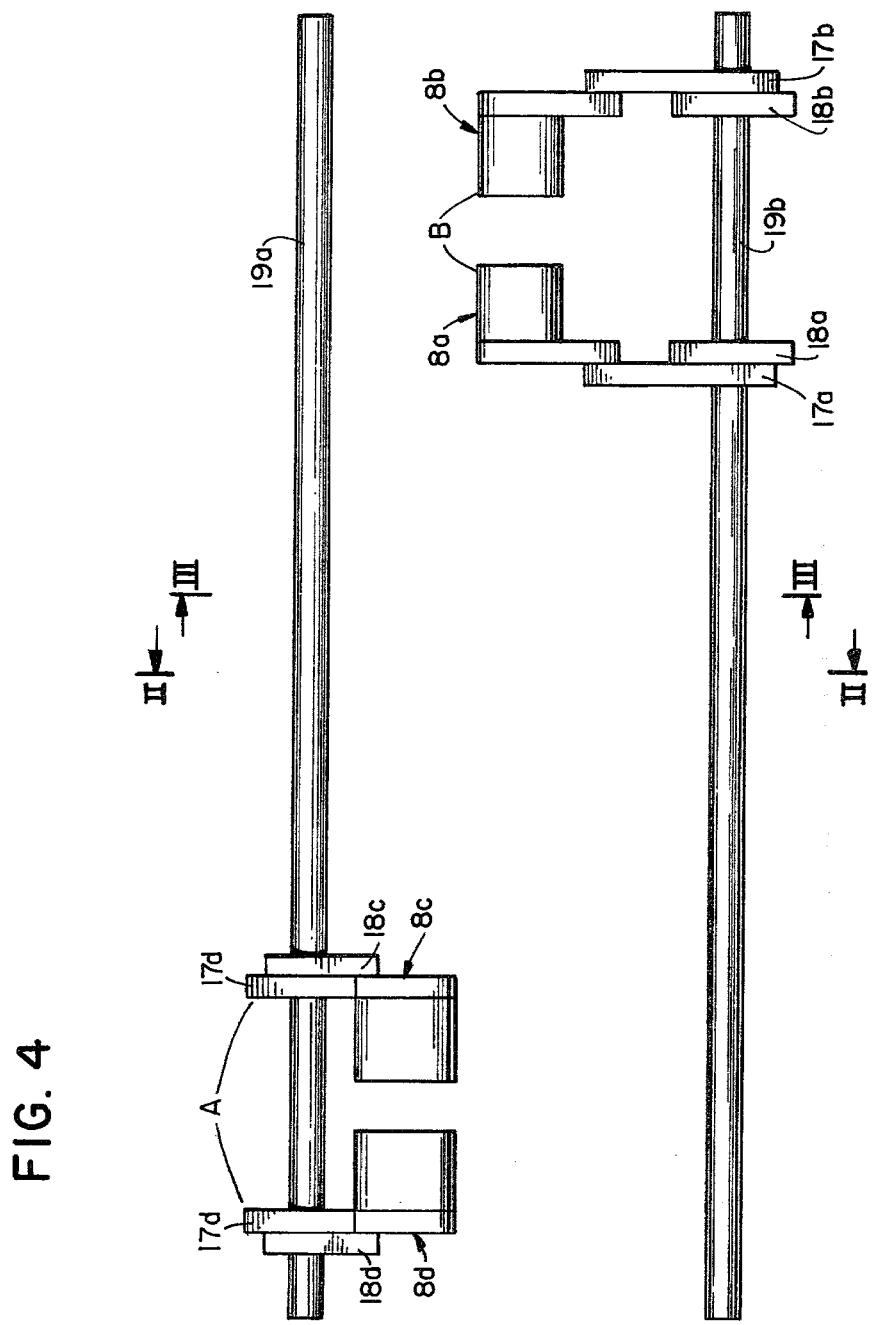
FIG. 4 shows a plan of the conveying apparatus 2 according to the invention with omission of some components.

In addition, the above-mentioned movements of the carrier 8a and 8b into their positions A, B and C shown in FIGS. 1, 4 and 5 are controlled in the following manner:

The position of the carrier 8 in position A is determined by the saddle apron 18a stopping against the buffer plate 51. The position of the carrier 8 in position B is correspondingly determined by, in particular, the compressed air cylinder 21a guiding the saddle apron slide 18a on to the buffer plate 52. The compressed air cylinder 21b then conveys the saddle apron slide 18b from position B until the fork head 23b stops against the buffer plate 54.

The components of the apparatus not shown in FIGS. 1, 4 and 5, which control the carriers 8c and 8d (not shown) utilise a corresponding and identical mode of operation.

The cycle set out in the above description of the operation of the apparatus according to the invention can now be repeated as frequently as desired, in which case the section 6' of the tubular covering formed continuously in this way is sealed on one side with the aid of a sealing, clipping, separating and loop inserting device 11 known per se in position B and is separated, having been cut to length. By rotating the conventional automatic filling revolver 12 (part of the known tube covering filling and clipping machine), which is provided with at least two filling tubes 13 and 14, the tubular covering section 6' arranged on the tube 13 is guided into position D required for filling the covering. The filling tube 14 now guides the tubular covering, which is designated by 6" in FIG. 1, through a conventional pressure charging means for filling pastry material, for example sausage meat, the so-called "skin brake" 15 guiding the tubular covering 6" in known manner during the filling process and ensuring by braking that the filling of the covering is tight. The closing and clipping apparatus 16 which is also commercially available then seals the filled tubular covering 6" formed in this way (for example a sausage) in the usual manner directly after the filling process. Numerous variations of the method according to the invention described above and of the apparatus according to the invention for carrying out the method, as mentioned in the above description, are feasible without departing from the scope of the invention. Thus, an automatic arresting means for securing the fixing device on the cross-beams 19a and 20a may of course also be used instead of the fixing apparatus 48 arranged on the tubular covering opening apparatus 7 for the journals 47a and 47b. The same also applies to the corresponding fixing apparatus for the carrier 8.

In any case, the spatially overlapping rhythmical co-ordination of commercially available elements of apparatus according to the invention ensures a friction-free adaptation of commercially available tubular covering filling and closing machines to the rhythmically continuously operating tubular covering opening, conveying and dividing apparatus according to the invention.

I claim:

1. In an apparatus for opening conveying and dividing tubular coverings, the improvement comprising: means for continuously feeding a moist tubular covering, pneumatically operating tubular covering opening means, pneumatically operating tubular covering conveying means in synchronous operation with the opening means, and dividing and closing means spatially overlapping the conveying means and in synchronous operation therewith, the opening means, conveying means and closing and dividing means arranged consecutively on the tubular covering conveying run, and wherein the tubular covering conveying means comprises a tong like conveying gripper device movably mounted on both sides of the tubular covering in the tubular covering conveying direction for grasping and conveying the open tubular covering, which is free from filling, on its outer circumference on alternate sides.

2. An apparatus according to claim 1, wherein the tubular covering opening means comprises at least two tubular covering lifting devices.

3. An apparatus according to claim 2, wherein the tubular covering opening means comprising holding and guide devices slidably mounted on support elements.

4. An apparatus according to claim 3, wherein the conveying means includes actuatable carriers coupled at a distance from each other.

5. An apparatus according to claim 4, further comprising mechanical control means including spindle drives for actuating the carriers.

6. An apparatus according to claim 4, wherein each carrier has a first half tong and a second half tong.

7. An apparatus according to claim 6, wherein each of the half tongs has at least one tubular covering loosening device.

8. An apparatus according to claim 6, wherein each of the half tongs has two tubular covering loosening devices.

9. An apparatus according to claim 7, wherein each of the tubular covering loosening devices comprises tube nipples.

10. An apparatus according to claim 9, wherein the tube nipples each have a tube fork end piece.

11. An apparatus according to claim 4, further comprising pneumatic control means for actuating the carriers.

* * * * *